March 27, 1956  D. E. YOCHEM  2,739,588
HYPODERMIC SYRINGE GAUGE

Filed Oct. 6, 1954  2 Sheets-Sheet 1

INVENTOR.
DONALD E. YOCHEM
BY
ATTORNEYS

March 27, 1956     D. E. YOCHEM     2,739,588
HYPODERMIC SYRINGE GAUGE
Filed Oct. 6, 1954     2 Sheets-Sheet 2
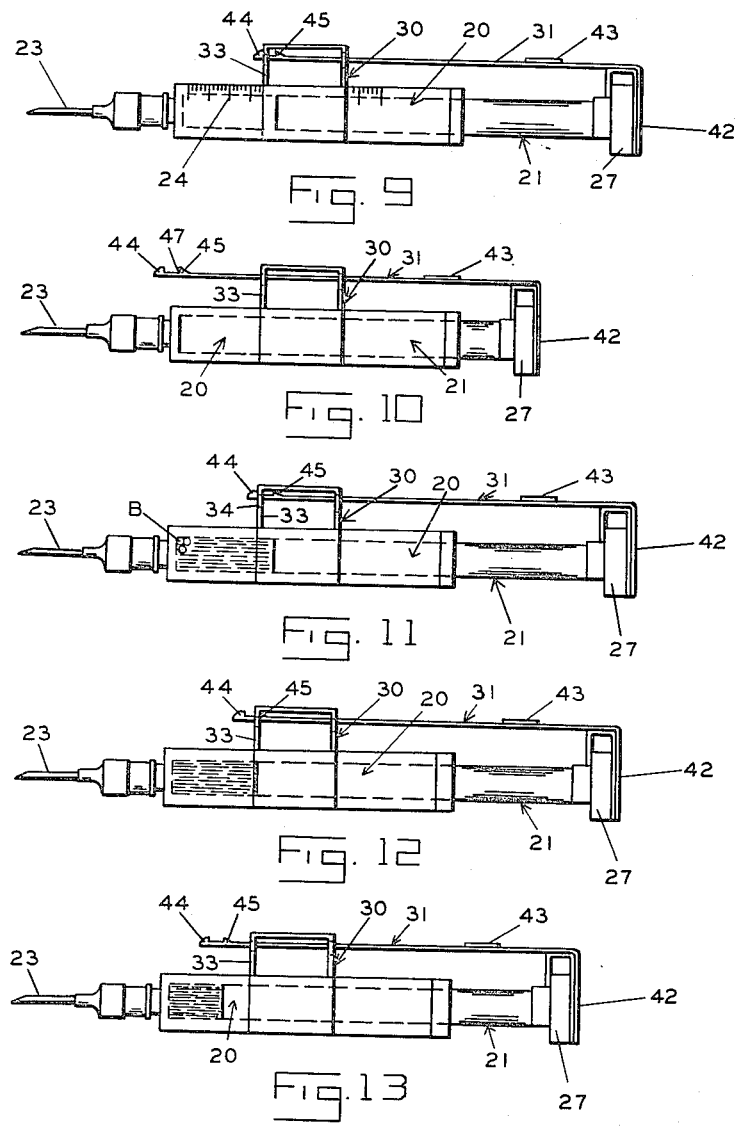
INVENTOR.
DONALD E. YOCHEM
BY
ATTORNEYS United States Patent Office 2,739,588
Patented Mar. 27, 1956

2,739,588

HYPODERMIC SYRINGE GAUGE

Donald E. Yochem, Columbus, Ohio

Application October 6, 1954, Serial No. 460,688

7 Claims. (Cl. 128—218)

My invention relates to a hypodermic syringe gauge. It has to do, more specifically, with a gauging device which can be readily attached to a hypodermic syringe and can be readily adjusted or set to determine the amount of liquid to be ejected from the syringe.

The greatest usefulness for my instrument is for use by humans who have diabetes mellitus and must administer to themselves daily injections of insulin. It is very difficult or impossible for many of these patients to see the small numbers and lines which indicate the dose of insulin on the usual hypodermic syringe. The exact dose prescribed by the physician for this type of patient is essential for proper treatment. My instrument can be set by the physician to gauge the correct amount of insulin to be ejected from the syringe, and is thereafter foolproof for the patient to use, thereby preventing the injection of too much or too little insulin. Thus, when my gauge is used, the patient is assured of receiving the exact dose prescribed by the physician, even though the patient has impaired vision, or is incompetent to administer the correct dose to himself without my gauge. Furthermore, diabetic patients, even with normal vision, can administer insulin to themselves with greater ease, assurance, confidence, and without wasting insulin, when my gauge is used.

In the accompanying drawings I have illustrated an example of my invention. In these drawings:

Figure 9 is a diagrammatic view showing the initial setting of the gauge member on the syringe prior to withdrawing insulin from the vial.

Figure 10 is a similar view showing the syringe after the plunger has been pushed into position to force air into the vial.

Figure 11 is a similar view showing the plunger retracted to filling position, thereby having withdrawn insulin from the vial and into the syringe barrel.

Figure 12 shows the plunger pushed forwardly slightly but sufficiently to eliminate the air bubbles produced in filling the syringe.

Figure 13 shows the plunger as it is being pushed forwardly during ejection.

Figure 1:
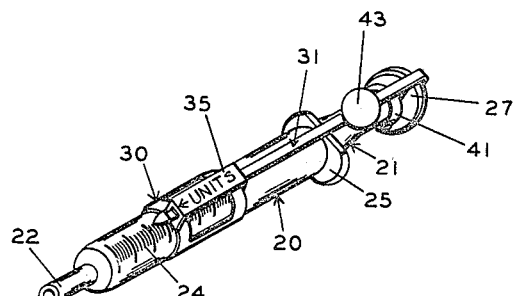
Figure 1 is an isometric view of a hypodermic syringe having my gauge applied thereto.

With reference to the drawings, in Figure 1 I have illustrated my gauge applied to a hypodermic syringe of the standard or usual type. This type of syringe is usually made of glass and comprises the barrel 20 and the plunger 21 mounted for reciprocation therein.

The barrel 20 is provided on its forward end with the needle stem 22 which removably receives the usual needle 23 (Figures 9 to 13). The barrel is calibrated in the usual way, being provided with the calibrations 24 which indicate dosage. The rear end of the barrel is provided with the usual laterally extending flange 25.

The plunger 21 comprises a body which slidably fits into the barrel 20 and which is provided with a narrowed neck 26 at its rear end which projects from the barrel in the usual way even when the plunger is moved into its forwardmost position. On the extreme rear end of the plunger there is provided the knob or head 27. The head 27 and the narrowed neck 26 serve in the usual way to provide gripping means for retracting the plunger 21 from the barrel and the head 27 serves as pushing means for pushing the plunger into the barrel.

My gauge, which is applied to the syringe, consists of two main parts, the guide clasp 30 which is applied to the barrel 20 and the gauge bar 31 which is applied to the plunger 21 and which cooperate with each other as shown in Figure 1.

Figure 2:
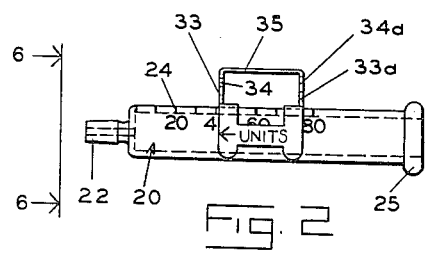
Figure 2 is a side view of the barrel of the syringe with the guide clasp of the gauge clasped thereto.

The guide clasp 30 comprises a clasping body which includes clasping spring straps 32 of arcuate form, being greater than a semi-circle, of a proper size to clasp around the barrel 20 and to tightly hold the member 30 in adjusted position thereon but permitting axial adjustment therealong if sufficient pressure is applied axially of the barrel on the clasp. When the guide clasp 30 is mounted on the barrel 20, as shown in Figures 1 and 2, it is set by the physician with its forward edge in exact alignment with one of the calibrations 24 on the barrel which is selected by the physician to give the proper number of units of insulin to the patient. The guide clasp 30 also includes the radially extending arms 33 and 33a which are provided with the respective guide openings 34 and 34a which align on an axis parallel to the axis of the clasp 30 and, therefore, parallel to the axis of the barrel 20 when the guide clasp is mounted thereon. The outer ends of the arms 33 and 33a are joined by a flat strap 35 and the arcuate straps 32 are joined together by flat straps 36 on diametrically opposed sides of the clasp 30. The straps 35 and 36 may be provided with arrows 37 indicating which end of the clasp 30 is to be aligned with the selected graduation 24.

Figure 3:
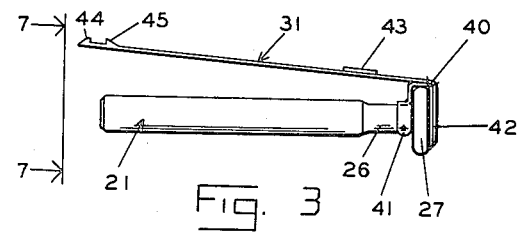
Figure 3 is a side view of the plunger of the syringe with the gauge bar of the gauge applied thereto.
Figure 4:
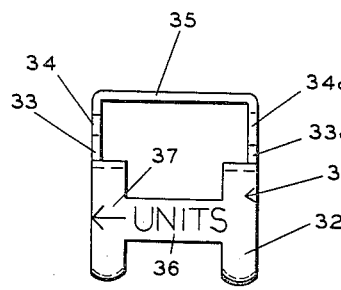
Figure 4 is an enlarged side view of the guide clasp.
Figure 5:
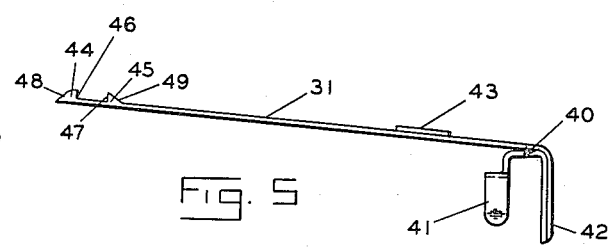
Figure 5 is an enlarged side view of the gauge bar.
Figure 6:
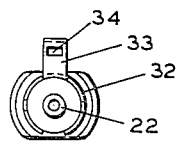
Figure 6 is an end view taken along line 6—6 of Figure 2.
Figures 7, 8:
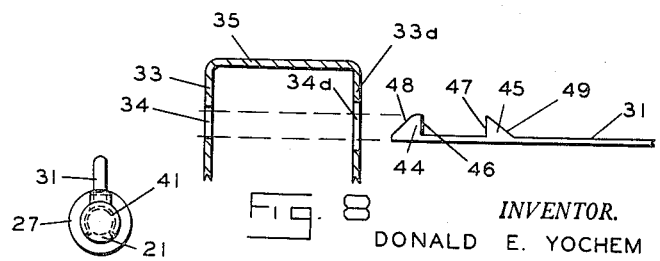
Figure 7 is an end view taken along line 7—7 of Figure 3.
Figure 8 is an enlarged view of the stops provided on the gauge bar and a portion of the guide clasp with which they are associated.

The gauge bar 31 is a flat bar of suitable spring metal which is provided at its rear end with a plunger-engaging yoke 40. This yoke 40 has a spring clasp yoke portion 41 which will straddle and clasp on the neck 26 of the plunger 21, as shown in Figure 3. It is also provided with a flat disk-like portion 42 which will engage the flat rear side of the head 27 of the plunger. It will be noted that yoke 40 is connected integrally with the bar 31 and that the connection is made so that the forward end of the bar 31 will tend to swing outwardly (Figures 3 and 5) so that the bar will normally be angularly disposed relative to the axis of the plunger 21, as shown in Figure 3. Adjacent its rear end, the bar 31 is provided with a button 43 by means of which it may be pressed downwardly toward the axis of the plunger 21. The extreme forward end of the bar 31 is provided with the longitudinally spaced stops 44 and 45, as shown in Figures 3, 5 and 8. The inner surfaces of the stops 44 and 45 facing each other, indicated respectively by numerals 46 and 47, are at right angles to the flat gauge bar 31. The forward surface 48 of the stop 44 is beveled and the rear surface 49 of the stop 45 is beveled.

It will be apparent from the above description that the guide clasp 30 can be mounted on the barrel 20 merely by forcing the spring straps 32 radially inwardly over the barrel 20 so that they will tightly embrace the barrel. The gauge bar 31 is clasped to the rear end of the plunger 21 by similarly forcing the yoke structure 41 around the neck 26 while positioning the disk portion 42 in juxtaposition with the outer surface of the head 27 of the plunger. Thus, at this time the guide clasp 30 will be on the barrel as shown in Figure 2 and the gauge bar 31 will be on the plunger 21 as shown in Figure 3.

The two parts of the syringe with the gauge parts thereon may now be assembled by slipping the forward end of the plunger 21 slightly into the rear end of the barrel 20. Then, by pressing down on the button 43, the extreme forward end of the bar 31 is aligned with the rear opening 34a in the guide clasp 30. It will be noted from Figure 8 that the stops 44 and 45 plus the bar 31 are of a thickness just slightly less than the height of the forward opening 34 and that the rear opening 34a is of greater height than the opening 34 extending slightly above and below the upper and lower edges of the opening 34. Also, the width of the bar and the stops is slightly less than that of the openings 34 and 34a. Therefore, if the plunger 21 is now pushed farther into the barrel 20, after depressing the bar 31, the bar 31 can pass into and through the opening 34a and then the opening 34 provided the bar 31 is swung downwardly sufficiently to preclude the straight surface 47 of stop 45 from engaging the arms 33a and 33. This insertion is facilitated by the beveled forward surface 48 of the stop 44. However, normally the structure will be as indicated in Figure 9 wherein the stops 44 and 45 will be on opposite sides of the forwardmost arm 33. The outward force exerted by the spring bar 31 will keep the stops 44 and 45 normally in a position ready for operation as shown in Figures 1 and 9. To remove the plunger 21 from the barrel 20, for cleaning and sterilizing, the reverse of the assembling steps described above are followed.

With the structure in the condition illustrated in Figure 9, the physician treating the patient will decide how much of a dosage of insulin is required by the patient. He will then move the guide clasp 30 along the barrel 20 to the proper position so that the front edge of the member 30 aligns with the calibration 24 on the syringe barrel indicating the proper amount in units of insulin to be injected. The next step is to insert the needle 23 into the rubber cap of the insulin vial, and force the plunger 21 inwardly as far as possible into the barrel 20, as shown in Figure 10. This forces substantially the same amount of air into the vial as the amount of insulin to be withdrawn, and thereby avoids a vacuum in the vial so that the insulin can be withdrawn. To permit the forward movement of the plunger 21, the gauge bar 31 is pushed downwardly to cause the straight locking surface 47 of the stop 45 to pass the forwardmost arm 33 of the guide clasp 30. The plunger 21 is now withdrawn, as shown in Figure 11, until the inner straight stopping surface 46 of the forward stop 44 engages the outer surface of the forwardmost arm 33. It will be understood that the inclined surface 49 of the rear stop 45 will have previously engaged this arm but will have freely passed through the opening 34 thereof since the beveled surface 49 will have automatically pushed the spring bar 31 downwardly. At this time, a supply of insulin will have filled the barrel 20 of the syringe but the usual air bubbles B which are present in the hollow part of the needle 23 and the hollow part of the needle stem 22 will be in the syringe barrel. To eliminate these air bubbles, it is merely necessary to push the plunger 21 forwardly until the straight surface 47 of the rear stop 45 engages the inner side of the arm 33, as shown in Figure 12. At this time, the barrel 20 of the syringe will have the predetermined dose of insulin suitable for the patient and without the air bubbles. To inject the insulin dose, it is only necessary for the patient to insert the needle 23 into himself and push the button 43 downwardly slightly to release the rear stop 45 from the rear surface of the forward arm 33 as shown by the dotted lines in Figure 13. Then plunger 21 is pushed forwardly to eject the insulin from the syringe barrel 20 into himself. Release of rear stop 45 from the forward arm 33 by the downward push on the gauge bar 31 as described above is made possible by having the lower edge of the rear opening 34a at a lower level than the lower edge of the forward opening 34 as shown in Figure 8.

It will be apparent that with this gauge member, the correct dose of insulin or other substance will be administered and this will not be dependent upon the judgment of the patient but will be dependent upon the setting of the guide clasp 30 which will be set by the physician. Also, with this gauge member the correct amount of air will be forced into the insulin or other sealed vial, thus avoiding a vacuum, so that the insulin or other substance can be withdrawn properly. Furthermore, provision is made for adequate space in the syringe barrel, after withdrawing the liquid from the vial into the barrel, to allow for the removal of the usual air bubbles before making an injection. Moreover, the removal of the air bubbles is accomplished without unnecessary loss of insulin since the necessary movement to eject the bubbles is positively limited by the stop arrangement. Also, my gauge is of such a nature that it will be impossible for the plunger to accidentally fall from the barrel which might cause breakage of the plunger. The stop arrangement for the plunger can be released preparatory to the ejection stroke, while making the injection and this can be accomplished by the use of one hand. This gauge is relatively simple and inexpensive to make and can be attached to or removed from the syringe with ease.

Various other advantages will be apparent from the preceding description, the drawings, and the following claims.

Having thus described my invention, what I claim is:

1. In combination with a hypodermic syringe comprising a barrel and a plunger movable therein, a gauge on the syringe, said gauge comprising a guide member mounted on the barrel of the syringe, a gauge member mounted on the plunger of the syringe, said guide member having a portion engaging the barrel of the syringe and a radially disposed guide arm having an opening therein, said gauge member being in the form of a gauge bar having its rear end connected to the plunger and its forward end free from the plunger, spring means tending to move the free end of the bar outwardly, longitudinally-spaced stops on the forward end of said bar for engaging said guide arm adjacent said opening, the forward end of said bar extending through the opening in said radial guide arm so that the spring tension on the gauge bar automatically engages the stops with said guide arm when the gauge bar is moved forwardly and rearwardly through said opening.

2. The combination of claim 1 in which said stops are a pair of radially projecting stops provided on the gauge bar with the forward stop having a beveled forward surface and a vertical rear surface at an abrupt angle to the bar and with the rear stop having a forward vertical surface at an abrupt angle to the bar and a beveled rear surface.

3. The combination of claim 2 in which the guide member has two axially spaced radially extending guide arms having aligning guide openings through which the gauge bar passes to prevent lateral twisting or binding in the guide member.

4. The combination of claim 3 in which the forward opening is of a radial extent slightly greater than the radial extent of the stops plus the thickness of the bar, and the rear opening is of greater radial extent and extends radially inwardly closer to the barrel than said forward opening.

5. The combination of claim 4 in which the portion of the guide member which engages the barrel is an arcuate spring clasping portion which yieldingly engages the barrel so that it can be adjusted axially thereof.

6. The combination of claim 5 in which the rear end of the guide bar has a spring clasping portion which removably engages the head of the plunger.

7. In combination with a hypodermic syringe comprising a barrel and a plunger movable therein, a gauge on the syringe, said gauge comprising a guide member mounted on the barrel of the syringe, said guide member having a portion engaging the barrel of the syringe and a radially disposed guide arm having an opening therein, a gauge member mounted on the plunger of the syringe and being in the form of a bar passing through the guide opening of the guide member, said gauge bar having its rear end connected to the plunger and its forward end free from the plunger, spring means tending to move the free end of the bar outwardly in frictional engagement with said opening, and a stop member on the gauge bar positioned to engage the guide arm adjacent said opening when the plunger is retracted relative to the barrel so as to predetermine the amount of liquid which can be pulled into the barrel of the syringe by the retracting movement of the plunger.

References Cited in the file of this patent

UNITED STATES PATENTS

| 996,128 | Payne et al. | June 27, 1911 |

FOREIGN PATENTS

| 5,541 | Great Britain | Mar. 7, 1907 |
| 182,206 | Switzerland | Apr. 16, 1936 |